(12) United States Patent
Mizutani (10) Patent No.: US 8,474,147 B2
(45) Date of Patent: Jul. 2, 2013

(54) METHOD AND APPARATUS FOR MEASURING SURFACE PROFILE OF SAMPLE

(75) Inventor: Naoki Mizutani, Chigasaki (JP)

(73) Assignee: ULVAC, Inc., Chigasaki-shi (JP)

( * ) Notice: Subject to any disclaimer, the term of this patent is extended or adjusted under 35 U.S.C. 154(b) by 697 days.

(21) Appl. No.: 12/668,705

(22) PCT Filed: Jul. 11, 2008

(86) PCT No.: PCT/JP2008/062581
§ 371 (c)(1),
(2), (4) Date: Jan. 12, 2010

(87) PCT Pub. No.: WO2009/011307
PCT Pub. Date: Jan. 22, 2009

(65) Prior Publication Data
US 2010/0288033 A1    Nov. 18, 2010

(30) Foreign Application Priority Data

Jul. 13, 2007   (JP) .................................. 2007-184390

(51) Int. Cl.
| G01B 5/20 | (2006.01) |
| G01B 5/28 | (2006.01) |
| G01B 21/20 | (2006.01) |
| G01B 7/28 | (2006.01) |
| G01B 7/34 | (2006.01) |

(52) U.S. Cl.
USPC ............. 33/502; 33/553; 73/105; 324/207.13

(58) Field of Classification Search
USPC .............. 33/502, 553–554, 558–558.01, 561; 73/1.79–1.81, 1.89, 105; 324/207.13; 700/28, 700/FOR. 102
See application file for complete search history.

(56) References Cited

U.S. PATENT DOCUMENTS

| 4,719,578 A | * | 1/1988 | Okitomo et al. .............. 700/161 |
| 7,038,202 B2 | * | 5/2006 | Murashita .................... 73/105 X |

(Continued)

FOREIGN PATENT DOCUMENTS

| JP | 2004-340868 | 12/2004 |
| JP | 2006-010469 | 1/2006 |

(Continued)

OTHER PUBLICATIONS

Derwent Abstract, English JPO abstract, and machine translation of JP 2007-57308 A, Canon KK, Mar. 2007, cited in the IDS.*

(Continued)

*Primary Examiner* — Thomas P Noland
(74) *Attorney, Agent, or Firm* — Stites & Harbison PLLC; Jeffrey A. Haeberlin; Stephen J. Weyer (57) ABSTRACT

A method for measuring surface profile of a sample, wherein jumping of a probe can be constrained without applying strong force to the sample, and an apparatus employing such a method. Control operation consists of detection of displacement in a probe in the vertical direction on the top surface of a sample being measured by means of a sensor, calculation of velocity and acceleration of the probe in accordance with detection of the displacement in the probe, detection of jumping of the probe through real-time monitoring of at least either velocity or acceleration of the probe, and a control of the current delivered to a stylus pressure generator for the probe. Such a control operation is performed in a small amount of time, and a stylus pressure applied to the probe is increased only while the probe is in the air, while the stylus pressure applied to the probe is returned to an original pressure before the probe touches the sample again.

7 Claims, 10 Drawing Sheets

U.S. PATENT DOCUMENTS

2002/0181963 A1* 12/2002 Takeda ............................ 399/45
2012/0146669 A1* 6/2012 Erickson ....................... 324/683

FOREIGN PATENT DOCUMENTS

| JP | 2006-226964 | 8/2006 | |
| JP | 2007-051875 | 3/2007 | |
| JP | 2007-057308 | 3/2007 | |
| JP | 2011075495 A * | 4/2011 | |

OTHER PUBLICATIONS

International Search Report for PCT/JP2008/062581.

* cited by examiner

METHOD AND APPARATUS FOR MEASURING SURFACE PROFILE OF SAMPLE

TECHNICAL FIELD

The present invention relates to a method and an apparatus for measuring the surface profile of a sample. More particularly, the present invention relates to a method and an apparatus that can suppress a jump of a probe (stylus) of a stylus type profile meter.

In the disclosure, the expression of "the surface profile of a sample" includes the concept of a step or steps of a sample, that of the film thickness of a sample and that of the surface coarseness of a sample.

BACKGROUND ART

Figure 1:
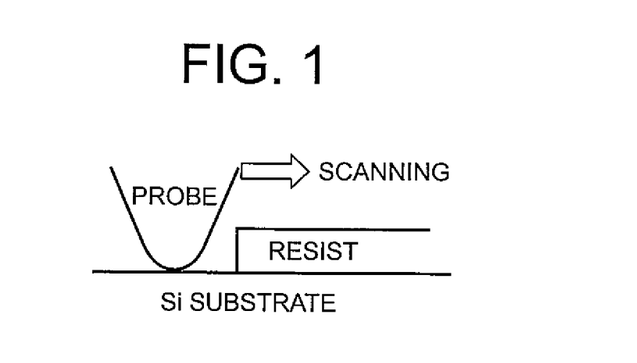
FIG. 1 is a schematic illustration of the behavior of a probe at a step of a sample.
Figure 21:
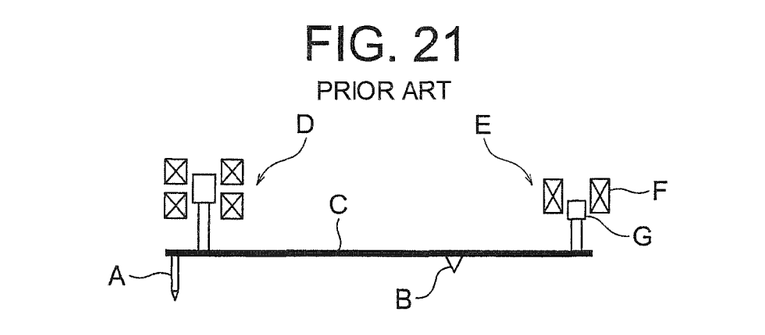
FIG. 21 is a schematic illustration of a known stylus type profile meter.

FIG. 21 of the accompanying drawings schematically illustrates an example of stylus type profile meter of the conventional art. In FIG. 21, A denotes a probe fitted to one of the opposite ends of a support member C that is placed on a fulcrum B so as to be able to swing on the latter. The fulcrum B is put on a fulcrum receiving recess. A displacement sensor D is arranged near the other end of the support member C in order to detect the vertical displacement of the probe A. The displacement sensor D is formed by using a differential transformer that generates an electric signal according to the vertical displacement of the probe A. At the same time, a probe pressure generator E for applying pressure to the probe A is arranged at the other end of the support member C. The probe pressure generator E has a coil F and a core G of a high magnetic permeability material arranged at a position shifted in the axial direction from the center of the coil F to press the probe A against the sample by the force that is generated according to the magnitude of the electric current flowing through the coil F to pull the core G of the high magnetic permeability material toward the center of the coil F. The probe A traces the surface of the sample as either the sample or the detection system thereof as shown in FIG. 1 of the accompanying drawings is driven to scan and minutely turns around the fixed fulcrum B according to the surface profile. Then, the displacement of the probe A is detected by the differential transformer D to observe and measure a surface step of the sample.

When measuring a soft sample by means of such a stylus type profile meter, the measurement time is required to be reduced in order to reduce the film thickness examination time. Then a high scanning speed is required while the force pressing the probe down needs to be reduced in order to prevent the sample from being deformed and/or damaged. However, when the sample is scanned at high speed by small force, the probe can jump up at a rising step as shown in FIG. 1 to make it impossible to accurately measure the step.

Figure 2:
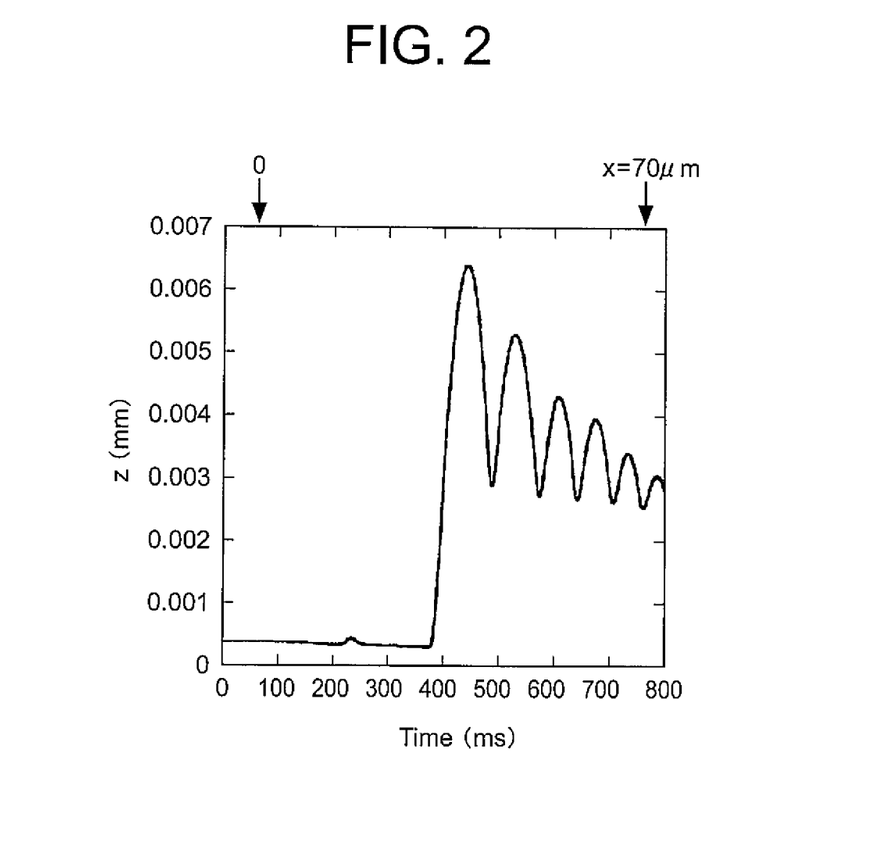
FIG. 2 is a graph illustrating how a probe jump at a step of a sample.

FIG. 2 of the accompanying drawings schematically illustrates an example of a jump of a probe. After jumping up into air at a step on a substrate, which is a sample, the probe oscillates for a number of times on the surface of the sample. The graph of FIG. 2 is obtained by measurement when the probe pressure was generated by a force of 0.15 mgf and the scanning speed of the probe was 0.1 mm/s. The sample was the same as the one illustrated in FIG. 1. In FIG. 2, the horizontal axis indicates time and the scanning operation started at time 60 ms and proceeded by 70 μm at time 760 ms. The resist film had an end, or a step, at position that corresponds to 380 ms and the displacement rose there so that the probe jumped up there. Then, the probe fell back but jumped up again on the surface of the resist film to oscillate repeatedly. The height of jump of the probe depends on the moment of inertia around the fulcrum and "the distance between the fulcrum and the probe" beside the above conditions (see, for example, Patent Document 1).

The inventor of the invention of the present patent application proposed to increase the force pressing down the probe in order to reduce the jump of the probe after detecting the jumps as a method for dissolving the jump problem of a probe (see Patent Document 1). With such a method, it is necessary to wait until the jumps of the probe (or oscillations of a plurality of times) subside, keeping the force being exerted to the probe to a raised level, and then reduce the force gradually to the original level. With this technique, the sample is subjected to large force for a certain period of time. Therefore, while the jumps of the probe are reduced, the sample is disadvantageously subjected to large force even for a short period of time.

Patent Document 1: JP-A-2006-226964

DISCLOSURE OF THE INVENTION

Problem to be Solved by the Invention

With the above-described method, the sample is deformed according to the force being exerted to the tip of the probe, or probe pressure, particularly in the case of measuring a soft sample such as a photoresist. When large force is exerted, the sample is deformed or damaged at the part exposed to the force so that the step or the film thickness cannot be measured accurately.

In view of the above-identified problem, it is therefore an object of the present invention to provide a method and an apparatus for measuring the surface profile of a sample that can raise the probe pressure only when the probe is in the air and reduce the probe pressure to the original level before the probe touches the sample again in order to prevent the sample from being subjected to large force and suppress jumps of the probe.

Means for Solving the Problem

In the first aspect of the present invention, the above object is achieved by providing a method for measuring a surface profile of a sample to be measured by bringing a probe into contact with a surface of the sample to be measured, characterized by executing a control operation of detecting the vertical displacement of the probe on the surface to be measured by means of a sensor, computing the speed and the acceleration of the probe according to the detection of the displacement of the probe, detecting the jump, if any, of the probe on a real time basis of at least either the speed or the acceleration of the probe by monitoring it and controlling the electric current to the probe pressure generator in a short period of time so as to raise the probe pressure being applied to the probe only when the probe is in the air and reducing the probe pressure to the original level before the probe comes back to contact the sample again.

In an embodiment of the present invention, the probe pressure being applied to the probe is reduced to the original level at or near the vertex of the trajectory of jump of the probe. The above control operation can be executed in 100 μsec.

With a method according to the present invention, preferably, the probe pressure being applied to the probe is raised when the probe speed determined on the basis of the detected displacement of the probe becomes not lower than a predetermined value for judging a jump of the probe and reduced to the original level when the probe speed falls below the predetermined value thereafter. With this arrangement, the predetermined value for the probe speed may be 40 μm/s in an embodiment.

Alternatively, with a method according to the present invention, the probe pressure being applied to the probe is raised when the probe acceleration determined on the basis of the detected displacement of the probe becomes not lower than a predetermined value for judging a jump of the probe and reduced to the original level when the probe acceleration falls below the predetermined value thereafter.

In the second aspect of the present invention, there is provided an apparatus for measuring a surface profile of a sample, characterized by comprising:

a probe vertically movable relative to the surface of a sample to be measured and also relatively movable along the surface of the sample to be measured;

a probe pressure application means for causing the probe to vertically apply probe pressure to the surface of the sample to be measured;

a detection means for detecting the vertical displacement of the probe; and a control means for detecting, if any, a jump of the probe according to an output signal of the detection means and raising or reducing the probe pressure by controlling the probe pressure application means according to the detection of a jump of the probe, and the control means executing a control operation of detecting the vertical displacement of the probe on the surface to be measured by the detection means, computing the speed and the acceleration of the probe according to the detection of the displacement of the probe, detecting the jump, if any, of the probe on a real time basis at least either the speed or the acceleration of the probe by monitoring it and controlling the electric current to the probe pressure generator in a short period of time so as to control the jump of the probe.

In an embodiment of apparatus according to the present invention, the control means executes the control operation in 100 μsec.

In an embodiment, the control means includes a measuring instrument for measuring the output signal from the detection means for detecting the vertical displacement of the probe and a short time constant is selected for the low pass filter of the measuring instrument so as to make it possible to follow the control operation on a real time basis. With the above arrangement, 100 μsec is selected for the time constant of the low pass filter of the measuring instrument.

In an embodiment of apparatus according to the present invention, the control means makes the data on the displacement of the probe that changes with time and is obtained by controlling and suppressing the jump of the probe pass through the low pass filter having a desired cutoff frequency and obtain data on the displacement of the probe that changes with time after suppressing the jump of the probe and removing noises.

Advantages of the Invention

As described above, a method in the first aspect of the present invention is devised to execute a control operation of detecting the vertical displacement of the probe on the surface to be measured by means of a sensor, computing the speed and the acceleration of the probe according to the detection of the displacement of the probe, detecting the jump, if any, of the probe on a real time basis at least either the speed or the acceleration of the probe by monitoring it and conducting the control operation of generating probe pressure and controlling the electric current to the probe pressure generator in a short period of time so as to raise the probe pressure being applied to the probe only when the probe is in the air and reducing the probe pressure to the original level before the probe comes back to contact the sample again. With this arrangement, the sample is not exposed to any large force and hence not damaged.

Additionally, when the probe pressure being applied to the probe is reduced to the original level at or near the vertex of the trajectory of jump of the probe, the speed at which the probe touches down at the surface of the sample is reduced to by turn reduce the extent of jumping back and hence the damage to the sample.

The change with time of the vertical displacement of the probe can be satisfactorily followed when the control operation is executed at 100 μsec.

Furthermore, with a method according to the present invention, it may be so arranged that the probe pressure being applied to the probe is raised when the probe speed that is determined on the basis of the detected displacement of the probe becomes not lower than a predetermined value for judging a jump of the probe and reduced to the original level when the probe speed falls below the predetermined value thereafter. With this arrangement, the height of jump of the probe can be reduced and hence the probe pressure that is applied when the probe touches back the sample is also reduced. Additionally, the speed at which the probe falls back to and collide with the surface of the sample is reduced so that the sample will not be damaged and the probe jumps up (again) only to a small extent.

In an apparatus in the second aspect of the present invention, the control means executes a control operation of detecting the vertical displacement of the probe on the surface to be measured by the detection means, computing the speed and the acceleration of the probe according to the detection of the displacement of the probe, detecting the jump, if any, of the probe on a real time basis at least either the speed or the acceleration of the probe by monitoring it and conducting the control operation of generating probe pressure and controlling the electric current to the probe pressure generator in a short period of time so as to control the jump of the probe. Therefore, the height of jump of the probe can be reduced to a large extent and the speed at which the probe falls back to and collide with the surface of the sample can also be reduced so that the sample can be measured highly accurately without being damaged.

BEST MODE FOR CARRYING OUT THE INVENTION

Now, an embodiment of the present invention will be described by referring to FIGS. 3 through 20 of the accompanying drawings.

Figure 3:
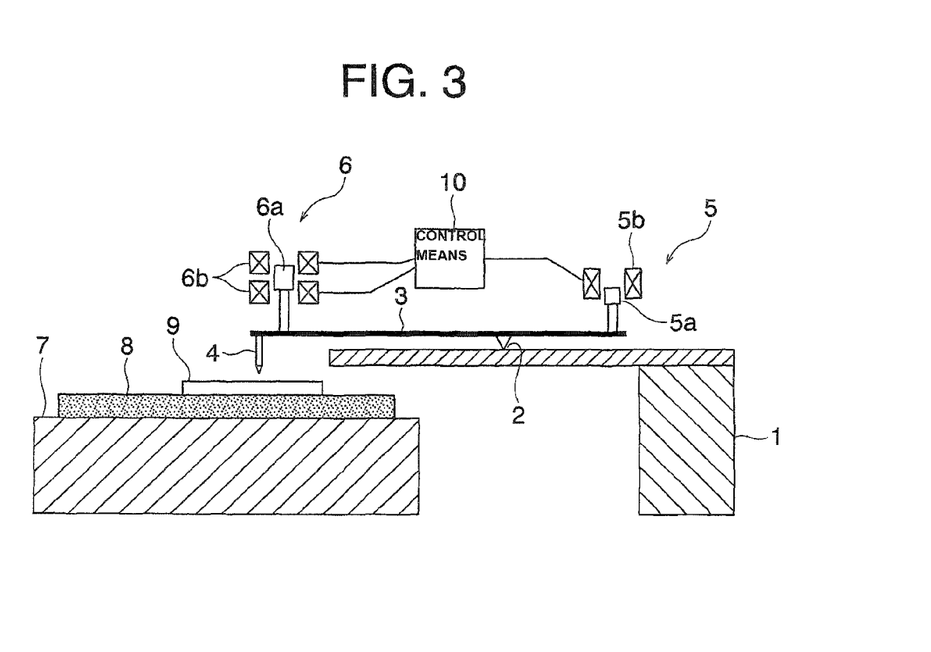
FIG. 3 is a schematic partial cross sectional view of an embodiment of measurement apparatus according to the present invention, showing the configuration thereof.

FIG. 3 is a schematic partial cross sectional view of an embodiment of measurement apparatus according to the present invention. In FIG. 3, 1 denotes an anchor support table and a swing support rod 3 is arranged above it by way of a fulcrum 2 and a probe 4 is arranged to face downward at one of the opposite ends (former end) of the swing support rod 3. The probe 4 has a diamond tip at the front end thereof. The front end generally shows a half diameter of 2.5 μm, although the half diameter may be larger or smaller than the cited value. A probe pressure application means 5 is arranged at the opposite end (latter end) of the swing support rod 3 to generate vertically downwardly directed force, or probe pressure, to be applied to the probe 4. In the illustrated instance, the probe pressure application means 5 is formed by an actuator 5a extending upward from the other end of the swing support rod 3 and a coil 5b having a hole for receiving the actuator 5a. A detection means 6 for detecting the vertical displacement of the probe 4 is arranged near the former end of the swing support rod 3 at a position close to the fulcrum 2 relative to the probe 4. The detection means 6 is formed by a sensor 6a rigidly fitted to the swing support rod 3 at one of the opposite ends thereof and a differential transformer having a coil 6b for receiving the other end, or the free end, of the sensor 6a.

In FIG. 3, 7 denotes a sample holder and a scanning stage 8 is arranged thereon so as to be able to move at a predetermined operation speed in relation to the probe 4. A sample 9, or an object of measurement, is fitted onto the scanning stage 8.

The detection means for detecting the vertical displacement of the probe pressure application means 5 and the probe 4 is connected to a control means 10, which control means 10 is designed to control the operation of the probe pressure application means 5 according to the output signal from the detection means 6. Note that the apparatus of FIG. 3 may alternatively be so designed that the sample 9 to be measured is rigidly secured in position and the probe is driven to scan.

Figure 4:
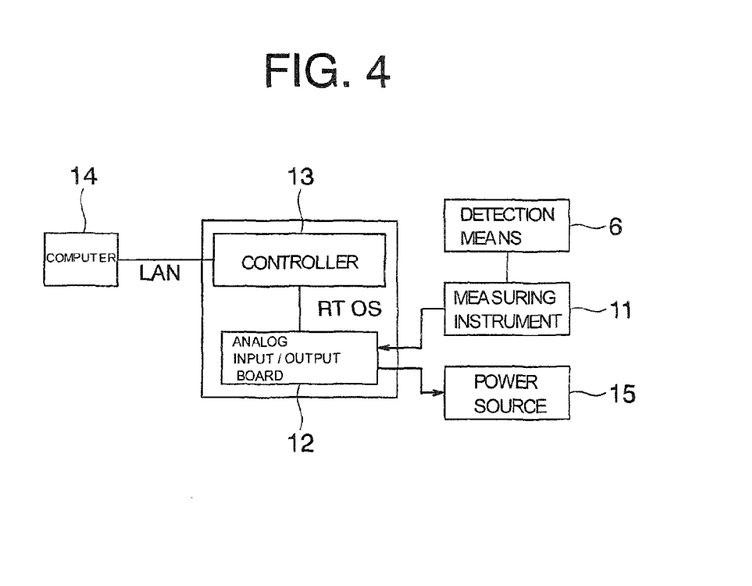
FIG. 4 is a schematic block diagram of an exemplar arrangement of a control means of FIG. 3.
Figure 5:
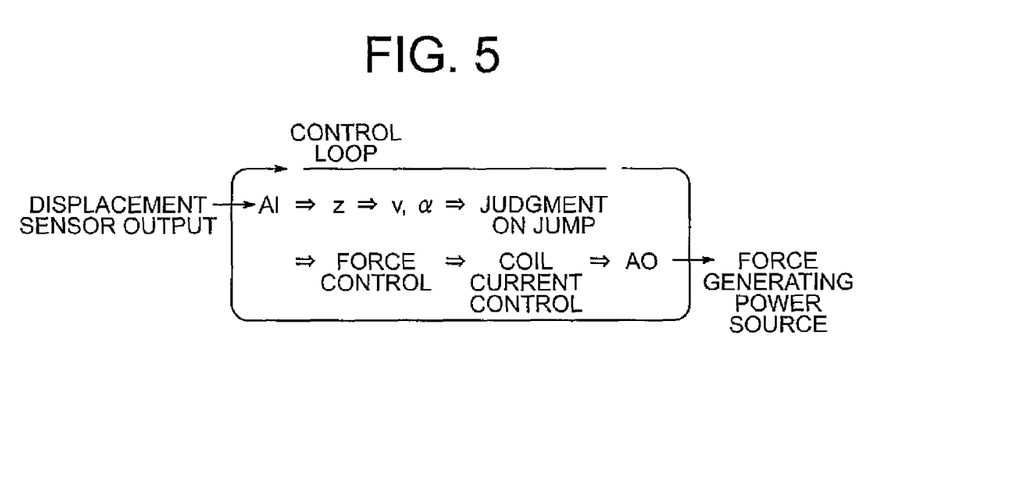
FIG. 5 is a schematic illustration of a control loop of the control means of FIG. 3.

FIG. 4 is a schematic block diagram of an exemplar arrangement of the control means 10 of FIG. 3. Note that FIG. 4 illustrates the measurement control system for suppressing and controlling the jump of the probe. In FIG. 4, the output of the detection means 6, or the displacement sensor, which may be formed by using a differential transformer is measured by a measuring instrument 11, which may typically be a lock-in-amp. The measuring instrument 11 outputs a displacement signal that represents the displacement of the probe it measured to an analog input/output board 12 as an analog signal. The analog input/output board 12 is controlled by a controller 13 that is operated by a real time OS to take in the analog signal from the measuring instrument 11. The signal is reduced to the vertical displacement z of the probe by a computer 14 connected to the CPU of the controller 13 by way of a LAN, which computer 14 operates so as to computationally determine the time differential dz/dt, or the displacement speed v of the probe, and the differential of the second order $d^2z/dt^2$, or the acceleration a of the probe, and judges an occurrence or non-occurrence of a jump of the probe on the basis of these values. In FIG. 4, 14 denotes a computer, which computer 14 is connected to the controller 13 by way of a LAN. As a jump is detected by the controller 13, it increases the electric current being flow to the coil 5b of the probe pressure application means 5 (FIG. 3) so as to increase the probe pressure. More specifically, an analog voltage signal for controlling the electric current being flown to the coil 5b is supplied to the power source 15 connected to the coil 5b through the analog input/output board 12 to control the power source 15. FIG. 5 schematically illustrates the operation of the control loop.

Now the method of suppressing the jump of the probe 4 will be described below.

The jump of the probe is suppressed by raising the force being exerted to press down the probe only when the probe is in the air and returning the level of the force to the original low level before the probe comes down back and touches the sample.

Figure 6:
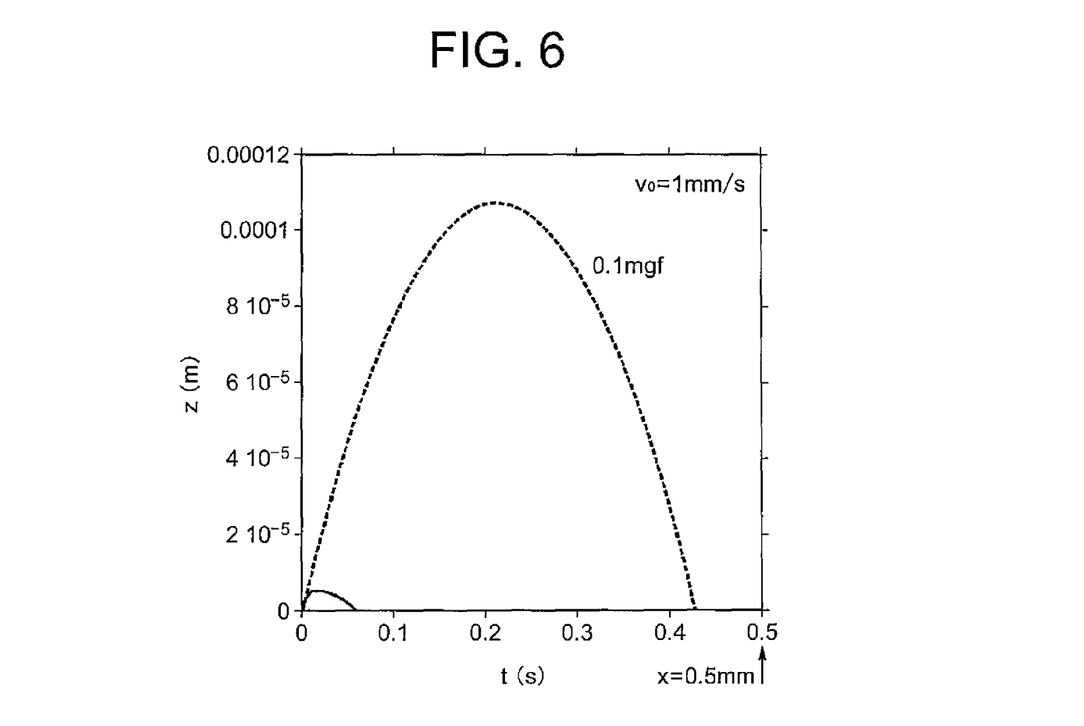
FIG. 6 is a graph illustrating the results of computations (solid line) for the trajectory of a probe jumping up at an initial speed of 1 mm/s in the z-direction that are obtained when the probe is controlled according to the present invention and those of computations (dotted line) for the trajectory of the probe jumping up at the same initial speed that are obtained when the probe is not controlled.
Figure 7:
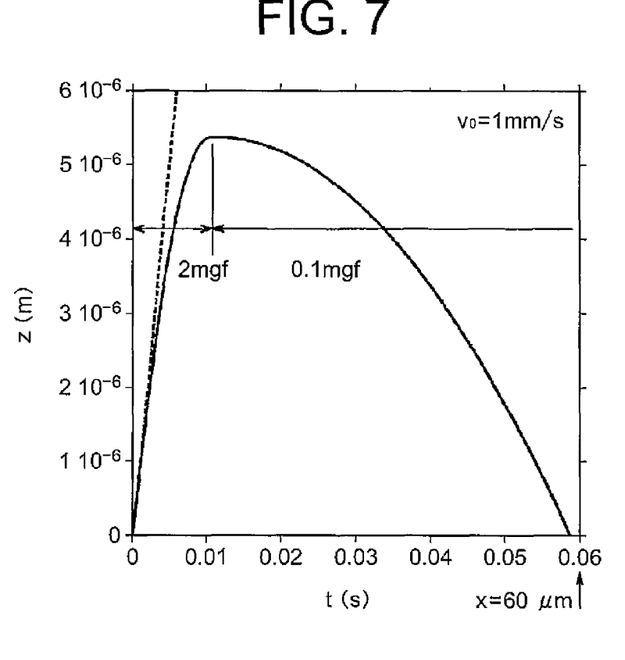
FIG. 7 is an enlarged view of a part of the graph of FIG. 6.

FIGS. 6 and 7 are graphs illustrating the results of computations of the trajectory of a probe that jumps up. In each these figures, the dotted line shows an instance where the jump is not suppressed, whereas the solid line shows an instance where the jump is suppressed under control according to the present invention. FIG. 7 is an enlarged view of a part of the graph of FIG. 6.

When the force being exerted by the tip of the probe 4 is F, the vertical position of the tip of the probe is z, the moment of inertia around the fulcrum 2 is I and the distance from the fulcrum 2 to the tip of the probe 4 is r, the following equation (1) is obtained by transforming the equation of motion around the fulcrum 2.

$$F = I/r^2 \, d^2z/dt^2 \quad (1)$$

Differently stated, the motion around the fulcrum 2 can be regarded as that of a material point having a mass of $I/r^2$ in a field where force F is acting. Therefore, the motion can be regarded as a free fall motion of the material point of the gravitational field while the probe 4 is jumping, and $d^2z/dt^2$ is constant if F is constant. In other words, the dotted line (the locus of z) in FIG. 6 is a parabola.

If the initial speed in the z-direction, or the vertical direction, of the tip of the probe 4 (the speed at which the tip of the probe 4 leaves the sample surface) is $v_0$ and the center of gravity of the movable part supported at the fulcrum 2 is assumed to be located close to the fulcrum 2, the maximum height h of the parabola and the duration of time $2t_0$ during which the tip of the probe jumps (from the time when the tip of the probe 4 leaves the sample surface to the time when it gets back to the surface again) are expressed respectively by the equations shown below.

$$h = I v_0^2 / 2 r^2 F \quad (2)$$

$$2 t_0 = 2 I v_0 / r^2 F \quad (3)$$

The graphs shown in FIGS. 6 and 7 show the results obtained when the initial upward speed $v_0$ of the probe 4 is 1 mm/s and the force (probe pressure) pressing down the probe 4 is 0.1 mgf. In FIGS. 6 and 7, the horizontal axis indicates time t (sec). Since $v_0$ can be regarded to be substantially equal to the scanning speed in the x-direction (see FIG. 1), the scanning speed=$v_0$ is assumed here and the x-coordinate value x of the probe $4=v_0 t$ is also assumed. The values of the graphs are computationally obtained, using $I/r^2=0.210$ g for the sensor.

The solid lines in FIGS. 6 and 7 show the results obtained by computations on an assumption that the force being exerted to the probe 4 is raised to 2 mgf when the probe 4 starts jumping and the form is reduced back to 0.1 mgf when dz/dt becomes equal to 0 thereafter. It will be seen that the height of jump of the probe 4 is reduced to 1/20 by raising the force being exerted to the probe 4 to 20 times of the normal force and the jumping time (the jumping distance in the x-direction) is also reduced. With this arrangement of the above embodiment of the present invention, the sample 9 is not damaged because a large force of 2 mgf is exerted only when the probe 4 is in the air.

If the large force of 2 mgf exerted to the probe 4 when the probe 4 started to jump is not reduced to the level of the original small force, the probe 4 jumps up again greatly because the downward speed of the probe 4 at the time of "touch down" is not made equal to and remains larger than the "upward speed at t=0". In short, the speed in the z-direction (the absolute value of the speed) |dz/dt| at the time of touch down needs to be made low. For this reason, the force being exerted to the probe 4 is returned to the level of the original small force at the vertex of the trajectory of the jump of the probe 4.

Figure 8:
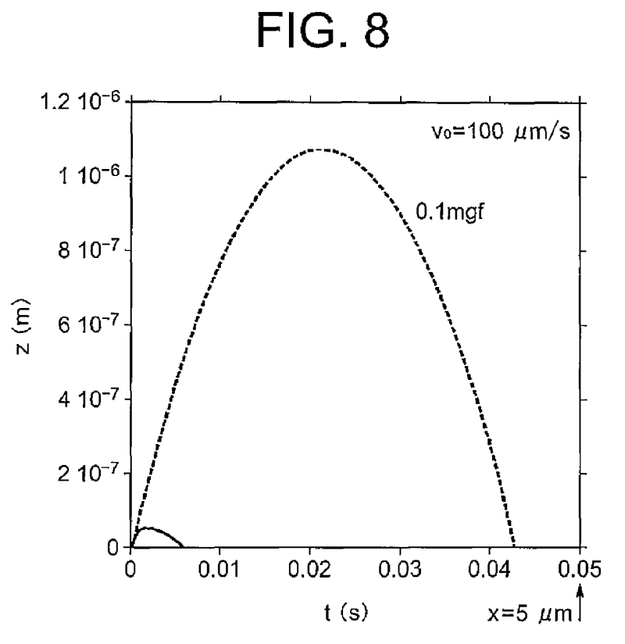
FIG. 8 is a graph illustrating the results of computations (solid line) for the trajectory of a probe jumping up at an initial speed of 0.1 mm/s in the z-direction that are obtained when the probe is controlled according to the present invention and those of computations (dotted line) for the trajectory of the probe jumping up at the same initial speed that are obtained when the probe is not controlled.
Figure 9:
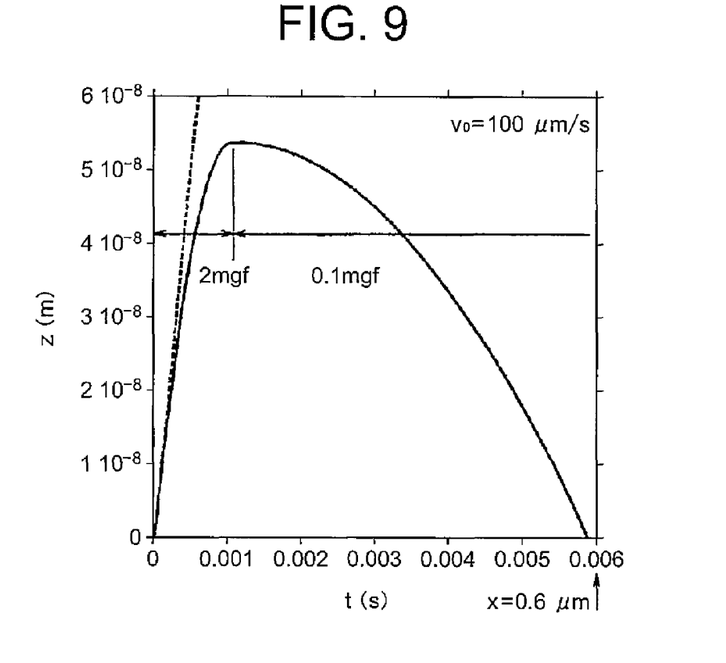
FIG. 9 is an enlarged view of a part of the graph of FIG. 8.

FIGS. 8 and 9 are graphs illustrating the results of computations for the trajectory of a probe jumping up at an initial speed $v_0$ of 100 μm/s, which is 1/10 of the initial speed of FIGS. 6 and 7, in the z-direction. In FIG. 8, the dotted line shows the trajectory of the probe when the probe is not controlled, whereas the solid line shows the trajectory of the probe when the probe is controlled according to the present invention. FIG. 9 is an enlarged view of a part of the graph of FIG. 8. The height of jump of the probe 4 is controlled to 1/20 by the control of returning the force at the vertex of the trajectory.

Figure 10:
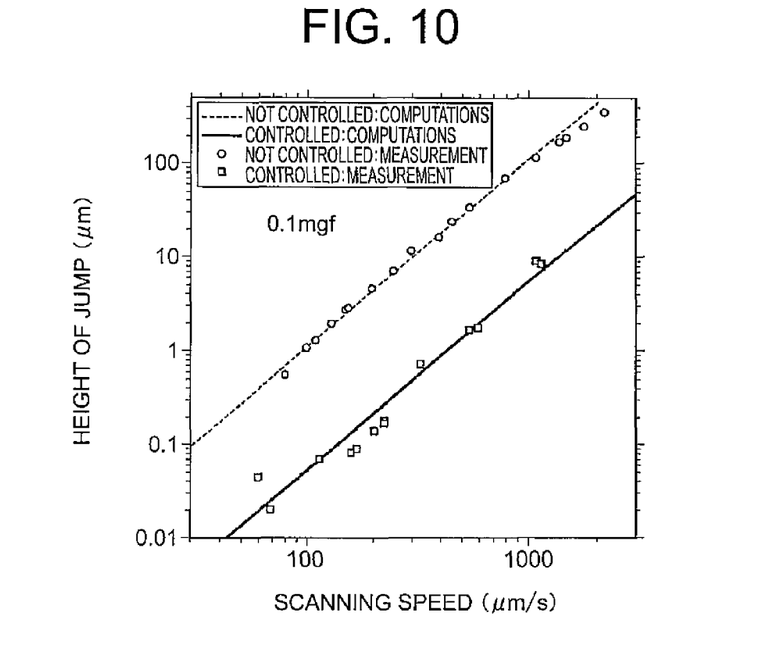
FIG. 10 is a graph illustrating the results of computations (solid line) and those of measurement (□) for the height of jump of a probe that are obtained when the probe is controlled according to the present invention and those of computations (dotted line) and those of measurement (○) that are obtained when the probe is not controlled.

FIG. 10 is a graph illustrating the relationship between the height of jump and the initial speed $v_0$ of the probe 4. The horizontal axis indicates the scanning speed because $v_0$ is substantially equal to the scanning speed. The $I/r^2$ of the sensor is 0.210 g. In the graph, the dotted line shows the results of computations obtained when the probe 4 is not controlled, whereas the solid line shows the result of computations obtained when the probe 4 is controlled according to the present invention. The height of jump of the probe 4 that is controlled according to the present invention is suppressed and reduced to 1/20 of that of jump of the probe 4 that is not controlled. While the graph shows an instance where the force being exerted to the probe 4 is raised to 2 mgf in the air, the height of jump of the probe 4 is further reduced by 1/2 when the force is raised to 4 mgf or when the $I/r^2$ of the sensor is reduced by 1/2 as will be seen from the equation (2).

Figure 11:
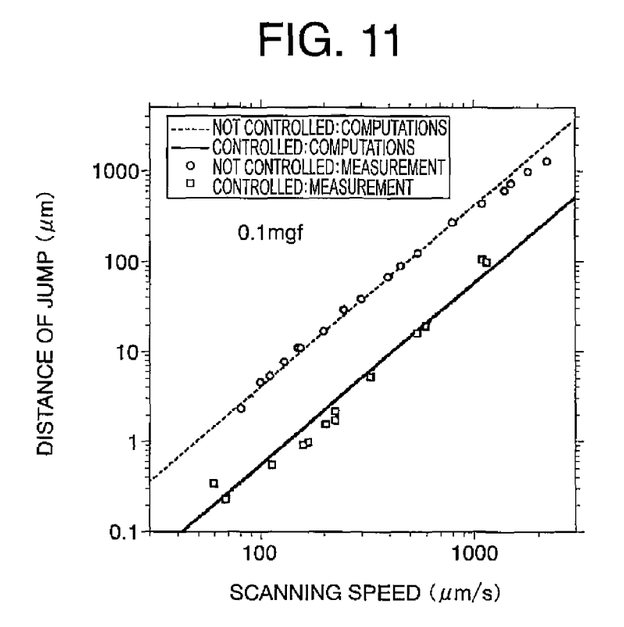
FIG. 11 is a graph illustrating the results of computations (solid line) and those of measurement (□) for the distance of jump of a probe that are obtained when the probe is controlled according to the present invention and those of computations (dotted line) and those of measurement (○) that are obtained when the probe is not controlled.

FIG. 11 is a graph illustrating the relationship between the horizontal distance of jump and the scanning speed of the probe 4 under the conditions same as those of FIG. 10. In the graph, the dotted line shows the results of computations obtained when the probe 4 is not controlled, whereas the solid line shows the result of computations obtained when the probe 4 is controlled according to the present invention. The horizontal distance of jump of the probe 4 that is controlled is suppressed and reduced to about 1/8 of that of jump of the probe 4 that is not controlled.

Figure 12:
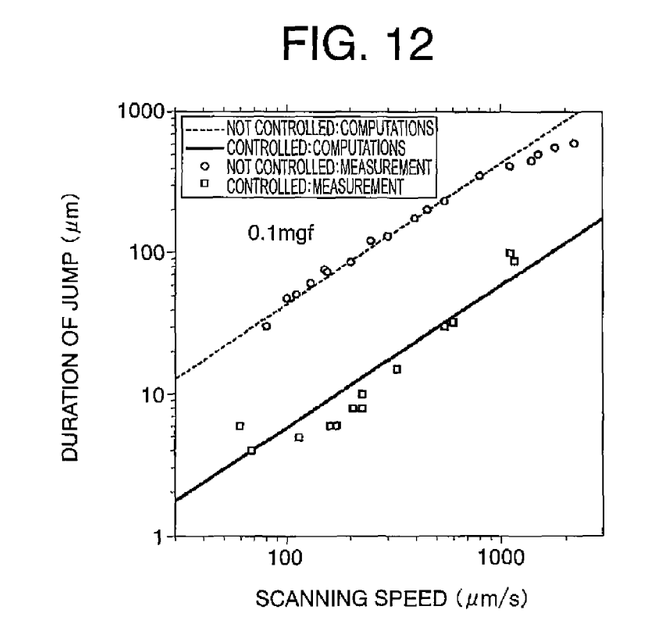
FIG. 12 is a graph illustrating the results of computations (solid line) and those of measurement (□) for the time of duration of jump of a probe that are obtained when the probe is controlled according to the present invention and those of computations (dotted line) and those of measurement (○) that are obtained when the probe is not controlled.

FIG. 12 is a graph illustrating the relationship between the time of duration of jump of the probe 4 under the conditions same as those of FIG. 10. The duration of jump of the probe 4 that is controlled is suppressed and reduced also to about 1/8 of that of jump of the probe that is not controlled.

The probe 4 that jumps up is made to come back to the initial level for the above examples of computations. Alternatively, the trajectory of the jump of the probe 4 may be determined by using the value of dz/dt. When the probe 4 is located on a flat region, its dz/dt is small even if noise is involved in the scanning operation. In other words, it may be safe to say that the probe 4 jumps up and raise the force being exerted to the probe 4 when its dz/dt exceeds a certain threshold level. Thereafter, the value of dz/dt gradually falls so that the force being exerted to the probe 4 may well be reduced to the original level when the vale of dz/dt comes back to about 0.

Still alternatively, the trajectory of the jump of the probe 4 may be determined by using the value of $d^2z/dt^2$. Since $d^2z/dt^2 = F/(I/r^2)$ when the probe 4 is in the air from the equation (1), a jump of the probe 4 can be detected by monitoring its $d^2z/dt^2$. More specifically, dz/dt and $d^2z/dt^2$ can be monitored on a real time basis by monitoring z on a real time basis.

As shown in FIG. 12, the duration of jump of the probe 4 according to the present invention will be several ms when the scanning speed is 100 μm/s. Therefore, a cycle of a control loop as shown in FIG. 5 needs to be executed in a period of time that is sufficiently shorter than the duration of jump in order to control the jump. Since a cycle of the control loop of the OS of Windows (registered trademark) is several ms in FIG. 5, which is rather long, it should be controlled by an OS that is more accurate and can execute the control loop in a shorter period of time. Then, the control loop may be executed in 100 μs, for example, for a cycle.

The time constant of the signal from the sensor also needs to be small in order to control the probe in a short period of time for a jump. When the output of a differential transformer by means of a lock-in-amp, the signal is made to pass through a low pass filter at the final stage of operation of the measuring instrument 11 and the time constant thereof also needs to be made equal to about 100 μm. Then, with this arrangement, the analog output signal from the measuring instrument 11 can be made to follow the actual changes of z.

The data that the profile meter ultimately requires may not be so time-sensitive. The cutoff frequency of the low pass filter may well be about 13 Hz. Data may well be ultimately taken in and displayed on a monitor at intervals of about 3 ms. Therefore, a low pass filter realized by software may be used for a computation process and the obtained data may be thinned and displayed on the display screen of the computer 14 of FIG. 4. Either the controller 13 or the computer 14 shown in FIG. 4 may be operated for the computation process and the data thinning process.

EXAMPLE

Now, the experiment conducted to confirm the effects and the advantages of the present invention and the obtained results will be described below.

Figure 14:
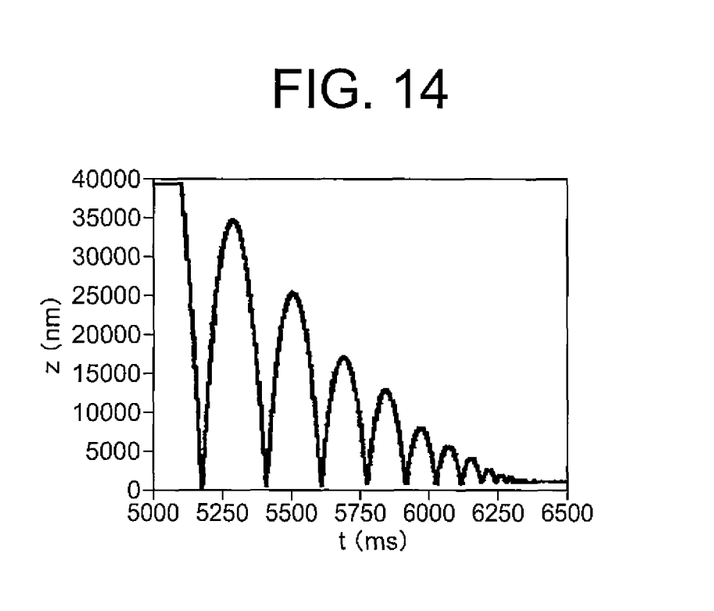
FIG. 14 is a graph illustrating the results of an exemplar measurement of the change with time of z of a probe that is not controlled.
Figure 15:
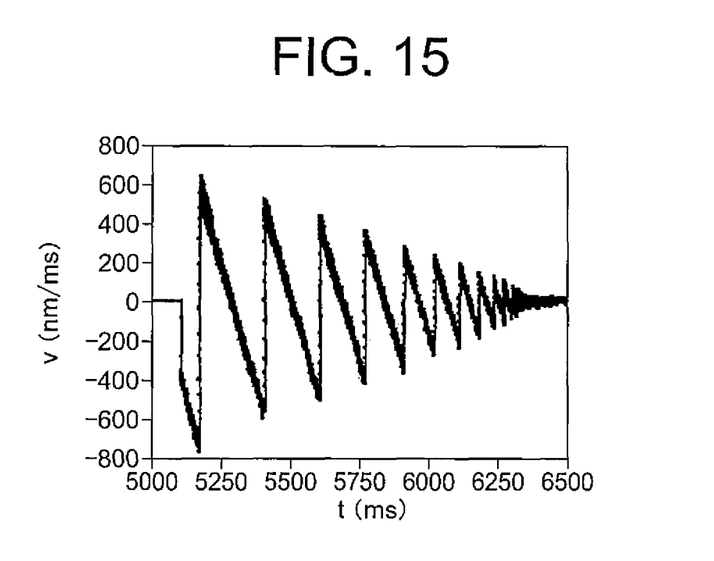
FIG. 15 is a graph illustrating the results of an exemplar measurement of the change with time of v of a probe that is not controlled.
Figure 16:
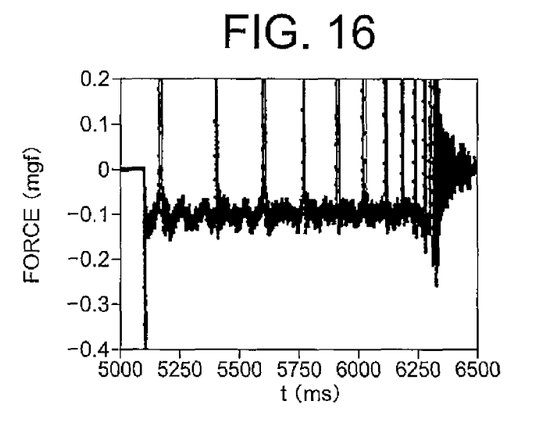
FIG. 16 is a graph illustrating the results of an exemplar measurement of the change with time of the force of a probe (probe pressure?) that is not controlled.

A sample 9 is placed near z=0 and z, v=dz/dt, force $F=I/r^2$ and the change with time of $d^2z/dt^2$ were observed while pressing the probe 4 down by a predetermined force of 0.1 mgf. FIGS. 14, 15 and 16 show the obtained results. Z obtained as a result of the observation was differentiated by time to computationally determine v and $d^2z/dt^2$ obtained as the differential of the second order was multiplied by $I/r^2$ to determine F. How the probe 4 rebounded on the surface of the sample 9 to oscillate was seen. The probe 4 was not driven to scan horizontally. The rebound was regarded as a jump of the probe 4 in a scanning operation and the rebound, or the jump, was reduced in the experiment. A measurement/control system having a configuration same as the one illustrated in FIG. 4 was employed for the experiment.

The graphs of FIGS. 14, 15 and 16 are those obtained when the probe 4 was not controlled to suppress the jump. The 0.3 ms was selected for the time constant of a single low pass filter of the RC, which was hardware, of the lock-in-amp. Four such low pass filters are connected in series and the cutoff frequency was 230 Hz. The data were taken in and displayed at regular intervals of 200 μs. A smoothing operation was conducted by means of moving average as anti-noise measures before computing the acceleration.

Figure 17:
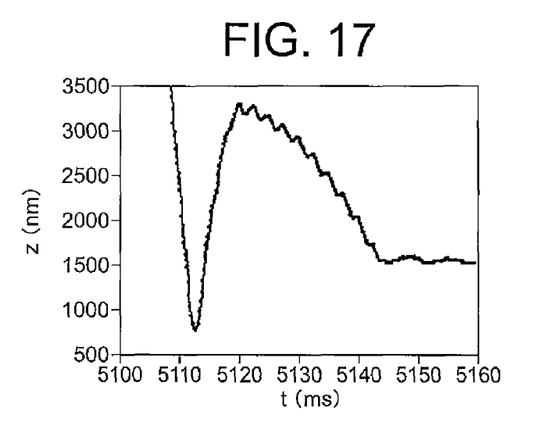
FIG. 17 is a graph illustrating the results of an exemplar measurement of the change with time of z when the initial speed in the z-direction is 600 nm/ms and controlled according to the present invention.
Figure 18:
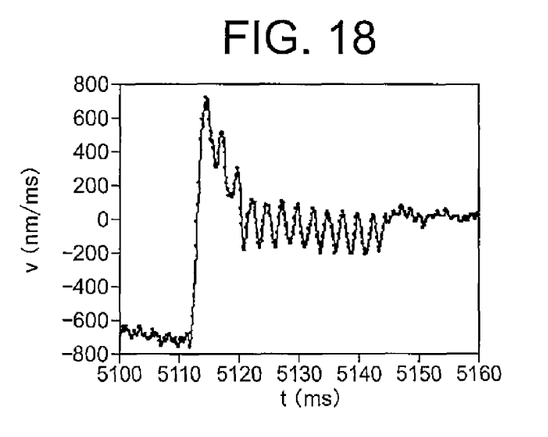
FIG. 18 is a graph illustrating the results of an exemplar measurement of the change with time of v when the initial speed in the z-direction is 600 nm/ms and controlled according to the present invention.

FIGS. 17 and 18 show the results obtained by applying the method of the present invention to such a rebound in the experiment. The control loop of FIG. 5 is repeated at a frequency of 10 kHz. The obtained data were thinned and displayed at every 200 μs in FIGS. 17 and 18. FIG. 17 is a graph illustrating the change with time of z whereas FIG. 18 is a graph illustrating the change with time of v. 0.1 ms was selected for the time constant of the low pass filters of the hardware RCs of the lock-in-amp and 700 Hz was selected for the cutoff frequency. The control program was so designed that the force was raised to 2 mgf when v exceeded 40 nm/ms (at about 5,113 ms) and returned to 0.1 mgf thereafter when v fell below 40 nm/ms (at about 5,120 ms). The height of jump was about 1,700 nm when the initial speed was about 600 nm/ms in the z-direction, which was found to be about 1/20 of the height observed when the jump was not suppressed under control (see FIG. 10). In FIG. 17, z is small at 5,113 ms probably because of deflection of the swing support rod (see symbol 3 in FIG. 3) of the sensor section.

The oscillations seen in FIGS. 17 and 18 are probably due to the oscillations of the swing support rod (see symbol 3 in FIG. 3) that linked the probe, the fulcrum and the displacement sensor core. The positional relationship of the components of the sensor section that was employed in the experiment differs from that of FIG. 3 and a sensor section wherein the force generator section was located at the side of the probe relative to the fulcrum and the core of the differential transformer was located at the opposite side was employed for the experiment.

The oscillations (between 5,113 ms and 5,144 ms) of the probe observed when the probe was in the air were probably those occurred due to the deflection of the swing support rod between the fulcrum and the core. The oscillations (after 5,144 ms) of the probe observed when the probe was on the sample were probably those induced by the vertical oscillations of the core located at the opposite side that occurred due to the deflection of the swing support rod between the probe and the fulcrum.

These oscillations were produced by the impact that arose when the probe hit the sample and hence attenuated with time. When data were taken for the surface profile, they were made to pass through a low pass filter with a cutoff frequency of about 13 Hz so that the oscillations were removed and did not give rise to any problem.

Figure 19:
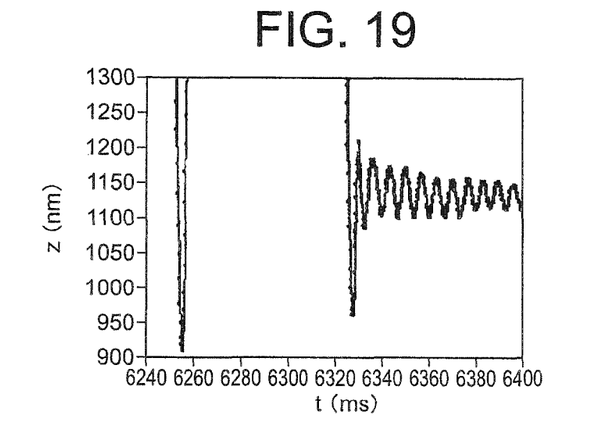
FIG. 19 is a graph illustrating the results of another exemplar measurement of the change with time of z when the initial speed in the z-direction is 110 nm/ms and controlled according to the present invention.
Figure 20:
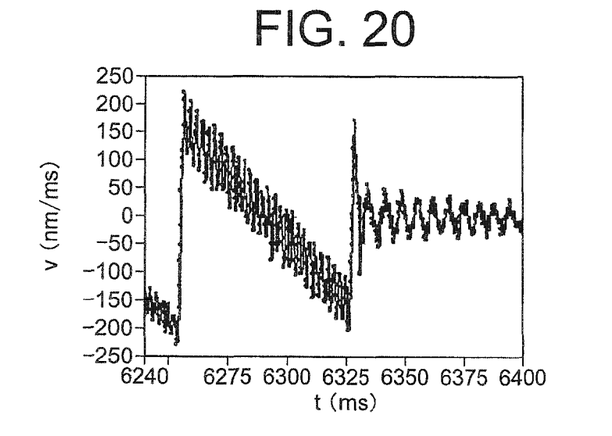
FIG. 20 is a graph illustrating the results of another exemplar measurement of the change with time of v when the initial speed in the z-direction is 110 nm/ms and controlled according to the present invention.

FIGS. 19 and 20 show an instance where the initial speed in the z-direction was small. The control method used for this instance was the same as the one used for that of FIGS. 17 and 18. The probe was monitored for a jump after 6,325 ms. The high rise near 6,330 ms indicates a jump of the probe and the duration of jump was as short as about 5 ms. The height of jump was about 70 nm when the initial speed was about 110 nm/ms (as the speed at which the probe jumped was estimated to be about 0.75 times of the downward speed immediately before the jump from other instances). The subsequent oscillations of z were due to the deflection of the swing rod support rod of the sensor section, which attenuated as seen from FIG. 19. The oscillations due to the jump would become invisible when they were made to pass through a low pass filter with a cut off frequency of about 13 Hz.

FIG. 10 summarily shows the results of the measurement. In FIG. 10, □s indicate the results of the measurement for the height of jump of a probe that were obtained when the probe was controlled according to the present invention and os indicates those of the measurement that were obtained when the probe was not controlled. Since the initial speed in the z-direction substantially corresponds to the scanning speed, the horizontal axis in FIG. 10 indicates the scanning speed. All the results substantially agree with the results obtained by computations and, according to the present invention, the height of jump could be reduced to 1/20 of the height of jump that was observed when the probe was not controlled. The height of jump was reduced to 1/20 because the force exerted after the detection of the jump was raised to 20 mgf, which was 20 times of the normal level. In other words, the height of jump could be reduced further when the force was raised further.

In the graph of FIG. 12, ■s indicate the results of the measurement for the duration of jump of a probe that were obtained when the probe was controlled according to the present invention and os indicate those of the measurement that were obtained when the probe was not controlled.

FIG. 11 is a graph showing the results of "the distance of jump in the x-direction" obtained by plotting the values obtained by multiplying "the duration of jump" shown in FIG. 12 by "the initial speed in the z-direction" which corresponds to the scanning speed. All the results substantially agree with the results obtained by computations and, according to the present invention, it was proved by the experiment that both the duration and the distance of jump could be reduced according to the present invention.

Figure 13:
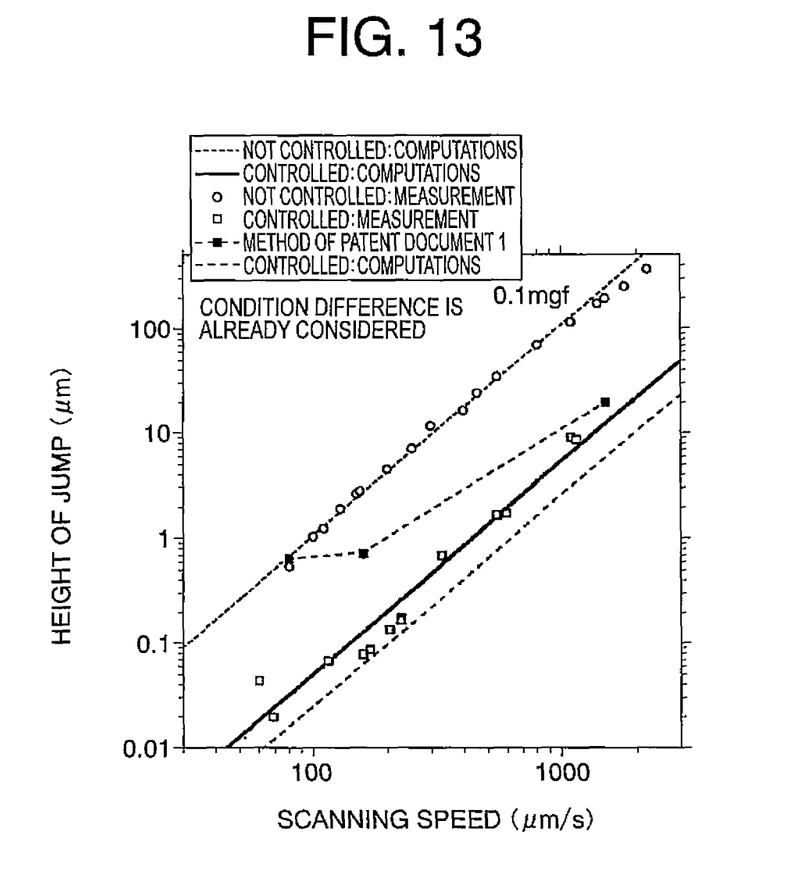
FIG. 13 is a graph illustrating the curves of FIG. 10 and those obtained by computations (broken line) and those obtained by measurement (■) for the height of jump according to a control method described in Patent Document 1.

In the graph of FIG. 13, ■s indicate the results of the measurement for the height of the jump of a probe that were obtained when the probe was controlled by the control method described in Patent Document 1. Note that the measurement was conducted for the present invention in an experiment under the conditions that match those of FIG. 10 and the data of the results are not shown in Patent Document 1. A sensor section whose $I/r^2$ was 0.114 g was employed and a force of 0.05 mgf was exerted to the probe while it was not controlled and a cycle of the control loop was executed in 3 ms. The force was raised to 2 mgf when a jump was detected and maintained to that level for a predetermined period of time and subsequently gradually reduced to the level of 0.05 mgf.

When the height of jump is expressed by $h=Iv_0^2/2r^2F$, the value of $I/(r^2F)$ is (0.114/0.05)/(0.21/0.1)=1.09 times of the value of FIG. 10 under the above conditions. In other words, the height of jump is 1.09 times greater in this instance of measurement for the same initial speed. Therefore, each of the observed heights was divided by 1.09 and the obtained values were plotted in the graph of FIG. 13 so that the ratios of reduction of height of the two instances of measurement can be compared. No substantial problem arises because the observed values are simply divided by 1.09. Since the exerted force was raised from 0.05 mgf to 2 mgf, which was 40 times greater, the values obtained by computations for a probe controlled by the control method according to the control method described in Patent Document 1, which are indicated by a broken line in FIG. 13, are 1/40 of the values of the dotted line. The results of measurement obtained by using the control method described in Patent Document 1 and plotted by ■s did not get to the level of the results of computations obtained by using the control method described in Patent document 1 and no significant effect was achieved particularly when the scanning speed was low. This fact is attributable to the fact that a cycle of the control loop took a long time and hence it indicates that the time necessary for executing a cycle of the control loop is vital.

EXPLANATION OF REFERENCE SYMBOLS

1: anchor support table
2: fulcrum
3: swing support rod
4: probe
5: probe pressure application means
6: detection means
7: sample holder
8: scanning stage
9: sample, or object of measurement
10: control means
11: measuring instrument
12: analog input/output board
13: controller
14: computer
15: power source

The invention claimed is:

1. A method for measuring a surface profile of a sample to be measured by bringing a probe into contact with a surface of the sample to be measured, said method comprising:
    executing a control operation of detecting the vertical displacement of the probe on the surface to be measured by means of a sensor,
    computing the speed and the acceleration of the probe according to the detection of the displacement of the probe,
    detecting a jump, if any, of the probe on a real time basis of at least either the speed or the acceleration of the probe by monitoring it, and
    controlling an electric current to a probe pressure generator in a short period of time so as to raise the probe pressure being applied to the probe only when the probe is in the air and reducing the probe pressure to the original level before the probe comes back to contact the sample again.

2. The method according to claim 1, wherein the probe pressure being applied to the probe is reduced to the original level at or near the vertex of the trajectory of jump of the probe.

3. The method according to claim 1, wherein the probe pressure being applied to the probe is raised when the probe speed determined on the basis of the detected displacement of the probe becomes not lower than a predetermined value for judging a jump of the probe and reduced to the original level when the probe speed falls below the predetermined value thereafter.

4. The method according to claim 1, wherein the probe pressure being applied to the probe is raised when the probe acceleration determined on the basis of the detected displacement of the probe becomes not lower than a predetermined value for judging a jump of the probe and reduced to the original level when the probe acceleration falls below the predetermined value thereafter.

5. An apparatus for measuring a surface profile of a sample, comprising:
    a probe vertically movable relative to the surface of a sample to be measured and also relatively movable along the surface of the sample to be measured;
    a probe pressure generator for causing the probe to vertically apply probe pressure to the surface of the sample to be measured;
    detection means for detecting the vertical displacement of the probe; and
    control means for detecting, a jump of the probe according to an output signal of the detection means and raising or reducing the probe pressure by controlling the probe pressure application means according to the detection of a jump of the probe, wherein
    the control means is arranged to detect vertical displacement of the probe on the surface to be measured by the detection means to compute speed and acceleration of the probe according to the detection of the displacement of the probe, to detect a jump, of the probe on a real time basis at least either the speed or the acceleration of the probe by monitoring it and to control an electric current to the probe pressure generator in a short period of time so as to reduce the probe pressure that is generated by the pressure generator and is applied to the probe at an originally set value at or near the vertex of the trajectory of jump of the probe.

6. The apparatus according to claim 5, wherein the control means includes a measuring instrument for measuring the output signal from the detection means for detecting the vertical displacement of the probe and a short time constant is selected for the low pass filter of the measuring instrument so as to make it possible to follow the control operation on a real time basis.

7. The apparatus according to claim 6, wherein the control means makes the data on the displacement of the probe that changes with time and is obtained by controlling and suppressing the jump of the probe pass through the low pass filter having a desired cutoff frequency and obtain data on the displacement of the probe that changes with time after suppressing the jump of the probe and removing noises.

* * * * *